(12) United States Patent
Shimomura

(10) Patent No.: US 10,443,482 B2
(45) Date of Patent: Oct. 15, 2019

(54) THERMOSTAT VALVE WITH TEMPERATURE RESPONSIVE THERMO-ELEMENT

(71) Applicant: Nippon Thermostat Co., Ltd., Tokyo (JP)

(72) Inventor: Kazuhito Shimomura, Tokyo (JP)

(73) Assignee: NIPPON THERMOSTAT CO., LTD., Tokyo (JP)

( * ) Notice: Subject to any disclaimer, the term of this patent is extended or adjusted under 35 U.S.C. 154(b) by 298 days.

(21) Appl. No.: 15/309,268

(22) PCT Filed: Apr. 1, 2015

(86) PCT No.: PCT/JP2015/060343
§ 371 (c)(1),
(2) Date: Nov. 7, 2016

(87) PCT Pub. No.: WO2015/198674
PCT Pub. Date: Dec. 30, 2015

(65) Prior Publication Data
US 2017/0074155 A1    Mar. 16, 2017

(30) Foreign Application Priority Data

Jun. 25, 2014  (JP) .................. 2014-130368

(51) Int. Cl.
*G05D 23/02*  (2006.01)
*F01P 7/16*  (2006.01)
(Continued)

(52) U.S. Cl.
CPC ............. *F01P 7/165* (2013.01); *F01P 7/16* (2013.01); *F01P 11/18* (2013.01); *G05D 23/022* (2013.01);
(Continued)

(58) Field of Classification Search
CPC ......... F01P 7/16; G05D 23/02; G05D 23/021; G05D 23/022; G05D 23/121;
(Continued)

(56) References Cited

U.S. PATENT DOCUMENTS

| 5,381,953 A * | 1/1995 | Fishman | F01P 11/16 236/34.5 |
| 5,971,288 A * | 10/1999 | Davis | G05D 23/021 236/68 R |
| 2015/0041552 A1* | 2/2015 | Maraux | G05D 23/022 236/101 R |

FOREIGN PATENT DOCUMENTS

| JP | S6087336 A | 5/1985 |
| JP | H06229240 A | 8/1994 |

(Continued)

OTHER PUBLICATIONS

International Search Report for PCT/JP2015/060343 dated Jun. 16, 2015.

*Primary Examiner* — Edward F Landrum
*Assistant Examiner* — Daniel C Comings
(74) *Attorney, Agent, or Firm* — Isshiki International Law Office; Joseph P. Farrar, Esq.

(57) ABSTRACT

A thermostat valve has a cylindrical valve housing formed as a single integrated unit out of synthetic resin material, having an annular body and a frame attached to one end of the annular body by a plurality of legs, a disk-shaped valve stem disposed in another end of the valve housing and movable along an axial direction, a spring seat that holds an opposite end of spring means away from the valve stem and locked and held in place by hooks at tips of locking arms extending from the valve housing, and a thermo-element fixedly mounted to an element guide provided in the frame of the valve housing that moves the valve stem in a valve opening direction in response to fluid temperature. An (Continued)

annular step having a top portion of predetermined width is formed adjacent to the rim of the opening in the one end of the valve housing.

6 Claims, 5 Drawing Sheets

(51) Int. Cl.
    *F01P 11/18*         (2006.01)
    *G05D 23/185*       (2006.01)
    *F01P 7/14*          (2006.01)

(52) U.S. Cl.
    CPC ...... *G05D 23/025* (2013.01); *F01P 2007/146* (2013.01); *G05D 23/185* (2013.01); *G05D 23/1852* (2013.01)

(58) Field of Classification Search
    CPC ............... G05D 23/123; G05D 23/185; G05D 23/1852; G05D 23/1856
    See application file for complete search history.

(56) References Cited

FOREIGN PATENT DOCUMENTS

| | | |
|---|---|---|
| JP | 2003193839 A | 7/2003 |
| JP | 2008157194 A | 7/2008 |

\* cited by examiner

THERMOSTAT VALVE WITH TEMPERATURE RESPONSIVE THERMO-ELEMENT

CROSS REFERENCE TO RELATED APPLICATIONS

The present application is a national phase entry under 35 U.S.C. § 371 of International Application No.: PCT/JP2015/060343, filed Apr. 1, 2015, published in Japan, which claims priority from Japanese Patent Application No. 2014-130368 filed Jun. 25, 2014, the entire disclosures of which are incorporated herein by reference.

TECHNICAL FIELD

The present disclosure relates to a thermostat valve in, for example, the cooling system of an automobile engine, in which the main valve and the relief valve that control the volume of coolant in response to temperature and pressure are formed as a single integrated unit.

BACKGROUND

A thermostat valve is installed in the cooling system of an automobile engine so that when the coolant is cold, such as just after the engine is started, the coolant is cut off from the radiator and circulated into the engine water jacket through the water pump, and when the coolant is hot, the coolant is supplied to the radiator and circulated to the engine after the coolant has been cooled.

Conventionally, a variety of different structures have been proposed for this type of thermostat valve. For example, a thermostat valve as disclosed in Patent Document 1 that is installed on the discharge side of the engine water jacket and controls the discharge of coolant is known. This thermostat valve uses a configuration in which the valve stem is closed in a direction that goes against the flow of coolant, onto a valve seat formed in the frame to simplify the structure of the valve as a whole, make the valve more compact, and improve valve performance.

This configuration is dictated by the fact that if, contrary to the foregoing description, the valve stem were to be closed with the flow of coolant, then the frame and other structural components would have to be configured to enable the valve stem to open against the flow and the pressure of the coolant when the valve opens, thereby unavoidably making the overall structure larger and more complicated. Moreover, a valve that operates this way tends to exhibit a delay in the movement of the valve stem, although this sort of problem is solvable.

PRIOR ART DOCUMENTS

Patent Documents

Patent Document 1: JP-H06-22924

BRIEF SUMMARY

However, with the conventional thermostat valve described above, not only is it difficult to ensure a tight seal of the valve when the valve stem is seated against the valve seat in the frame when the the valve is closed, it is impossible to simplify the structure as a whole, reduce the number of components, make the valve more compact, and moreover make the valve lightweight.

In other words, with the conventional structure, the valve stem and the valve seat formed in the housing form a tapered contact zone in which the area of contact is small and the seal cannot be said to be tight, thereby risking the problem of degrading the valve's performance as a seal. Therefore, with this type of thermostat valve, it is difficult to keep leakage to zero or a negligible amount.

Moreover, this type of thermostat valve, although it can be used as a fail-safe thermostat for a coolant control valve that runs off the motor like a rotary valve or the like, in such a use application generally the leakage volume is considered not just for the thermostat by itself but as a set together with the main cooling valve, and therefore the thermostat valve itself must be as small as possible. For this reason, there has long been demand for ways to simplify the overall structure of the thermostat valve as well as make the thermostat valve as small as possible.

The present disclosure is conceived in light of the above-described circumstances, and has as its object to provide thermostat valve with a built-in relief function that not only minimizes leakage when the valve is closed but also, by resin molding the housing as a single piece, simplifies the overall configuration of the thermostat valve and makes it more compact, reduces the number of components, and makes the valve more lightweight.

Solving the Technical Problem

The thermostat valve of the present disclosure provides a thermostat valve comprising a substantially cylindrical valve housing formed as a single integrated unit out of a synthetic resin material and having an annular body, with a valve seat formed on a rim of an opening in one end of the annular body and a frame attached to the annular body by a plurality of legs extending axially from an outer edge of an opposite end of the annular body; a disk-shaped valve stem disposed in one end of the valve housing and movable along an axial direction of the valve stem so as to be selectively seated against the valve seat; spring means that biases the valve stem in a valve closing direction to seat the valve stem against the valve seat; a spring seat disposed at an opposite end of the spring means away from the valve stem side, the spring seat locked and held in place by hooks at tips of locking arms extending from the valve housing; and a thermo-element, fixedly mounted to an element guide provided in the frame of the valve housing, that moves the valve stem in a valve opening direction in response to fluid temperature, wherein an annular step is formed at a portion of the valve housing adjacent to the rim of the opening in the one end of the valve housing, the annular step having a top portion of predetermined width, the top portion of the annular step forming the valve seat against which the valve stem is contactable as a plane.

The present disclosure also provides a thermostat valve wherein the valve housing is resin molded using a mold structure configured so that a parting line is formed at least at a location that avoids the top portion of the annular step.

The present disclosure also provides the thermostat valve as described above, wherein a plurality of projections is provided around the outer edge of the disk-shaped body of the valve housing, and the plurality of projections and the locking arms are together configured to restrict movement of the valve stem in a horizontal direction.

The present disclosure also provides the thermostat valve as described above, wherein each of the plurality of projections has a tip portion having a curved or chamfered surface on an inside edge of the tip portion.

The present disclosure also provides the thermostat valve as described above, wherein an engagement portion that engages a driving end of the thermo-element is formed in a center portion of the valve stem.

The present disclosure also provides the thermostat valve as described above, wherein the hooks at the tips of the locking arms have a tapered surface that slants inward toward the end of the tip of the hook.

Effects of the Disclosure

The thermostat valve of the present disclosure as described above provides an annular step having a certain predetermined width at one end of the disk-shaped body of the resin valve housing, along the rim of the opening therein, with the top of the annular step forming the valve seat that the valve stem contacts as a plane. Accordingly, a tight planar seal forming an area of contact can be achieved when the valve is closed, thus improving seal performance. As a result, it becomes possible to keep leakage to either zero or a negligible amount.

Moreover, since the valve housing is a resin molded product and can be easily molded in complex shapes, the number of constituent parts can be reduced in comparison to the conventional structure, assembly becomes easy, and moreover the thermostat valve can be made even more lightweight. In particular, with its poppet valve structure, adequate flow volume area can be achieved. As a result, the entire apparatus can be made smaller and more compact.

Moreover, due to the relation between the valve stem and the valve seat, the thermostat valve of the present disclosure can also function as a differential pressure valve. Thus, when the engine is under high load at low temperature, for example (such as at high rpm with the water pump also speeding up), it can also release excess pressure, thereby heading off breakage of pipes inside the cooling circuit.

In addition, because the thermostat valve of the present disclosure provides the annular step on the valve seat side of the valve housing so that the top of the annular step can provide a secure area of contact with the valve stem as a planar seal, the thermostat valve of the present disclosure can achieve a tight seal even if the valve stem is slightly misaligned.

In particular, according to the present disclosure, during resin-molding the valve housing the mold structure is such that it forms the parting line at a position that avoids the top of the annular step (for example, at a position outside the annular step) from the outer rim of the annular step, so that even if burrs appear during resin molding they do not affect the seal surface of the valve. As a result, since burr removal need not be performed, the number of manufacturing steps and manufacturing time can be reduced, thus enabling costs to be reduced. In addition, because the parting line P does not appear on the annular portion, a tight seal surface can be provided.

Moreover, according to the present disclosure, the engagement of the spring seat and the hooks at the tips of the locking arms extending from the valve housing is configured as a taper. This type of tapered engagement is more secure than a simple lock, and the actual locking area of the locking portion can be made smaller. As a result, the entire apparatus can be made more compact.

Generally, the thermo-element cannot be fixedly mounted along its outer diameter (installation section) and must instead be fixed in place by the tip of the piston and the thermo-element case alone. As a result, the thermo-element tends to be unstable. However, according to the present disclosure, a thermo-element guide is provided in the end frame of the valve housing, away from the valve stem and the valve seat, where it is possible to engage and hold the thermo-element, thus making it possible to eliminate the instability described above. In addition, the thermostat valve according to the present disclosure can prevent the leakage resulting from instability of the valve caused by engine vibration and sudden changes in pressure while the valve is open, can prevent valve drop-out or piston drop-out, and can hold these parts in place in the correct position radially.

In addition, according to the present disclosure, a thermo-element guide is provided as described above, and thus the thermo-element can be located in a fluid flow path at a position where it can easily sense the temperature.

Moreover, although this type of thermostat valve has sometimes been used as a fail-safe thermostat for a coolant control valve that runs off a motor like a rotary valve or the like, a valve having a structure like that of the present disclosure above can also be used in such cases. That is, in this type of fail-safe thermostat, generally the leakage volume is considered not just for the thermostat by itself but as a set together with the main coolant control valve, and therefore the thermostat valve itself must be as small as possible. Although there has long been demand for a more compact thermostat valve, the valve structure of the present disclosure can meet this demand.

DETAILED DESCRIPTION

Figure 1:
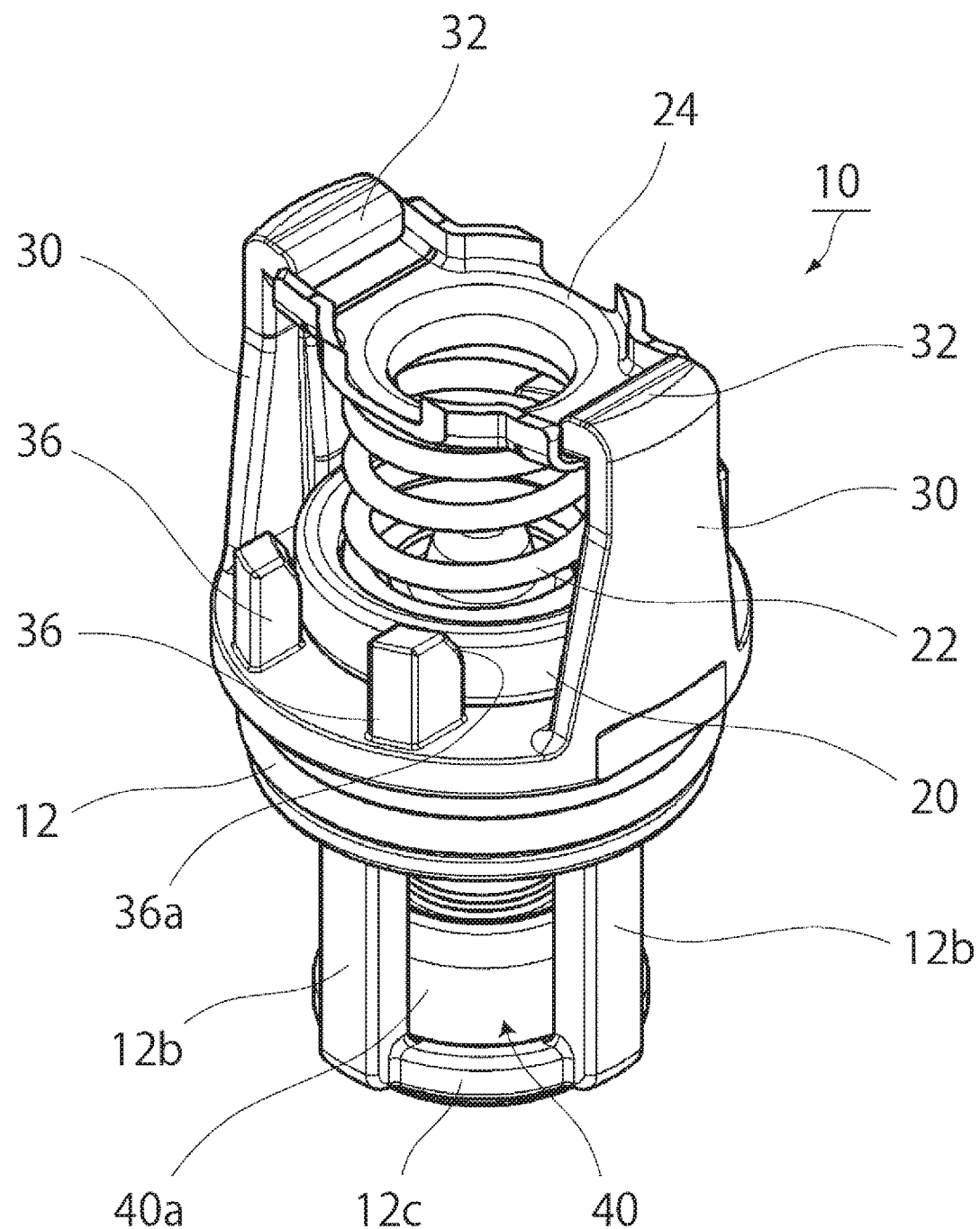
FIG. 1 is an overall schematic perspective view showing one embodiment of a thermostat valve according to the present disclosure.

FIGS. 1-4 show an embodiment of a thermostat valve according to the present disclosure.

In these drawings, the thermostat valve, indicated as a whole by reference numeral 10, is comprised of a valve housing 12 in which an annular body, four legs 12b extending axially along the outer periphery of the body, and an end frame 12c attached by these legs are formed into a substantially cylindrical shape made of a synthetic resin material as a single integrated unit.

At one end of the annular body of the valve housing 12 a valve seat 16 is formed along the rim of an opening 14 by an annular step 16a having a top having a certain predetermined width.

Reference numeral 20 is a shallow disk-shaped valve stem that forms the thermostat valve 10. The valve stem 20 is configured to move back and forth with respect to the valve seat 16 and is seated against the valve seat 16. Reference numeral 22 is a coil spring biased to contact the valve stem 20 against the valve seat 16. A spring seat 24 formed by an annular plate is provided on the side of the coil spring 22 away from the valve stem 20.

Figure 2:
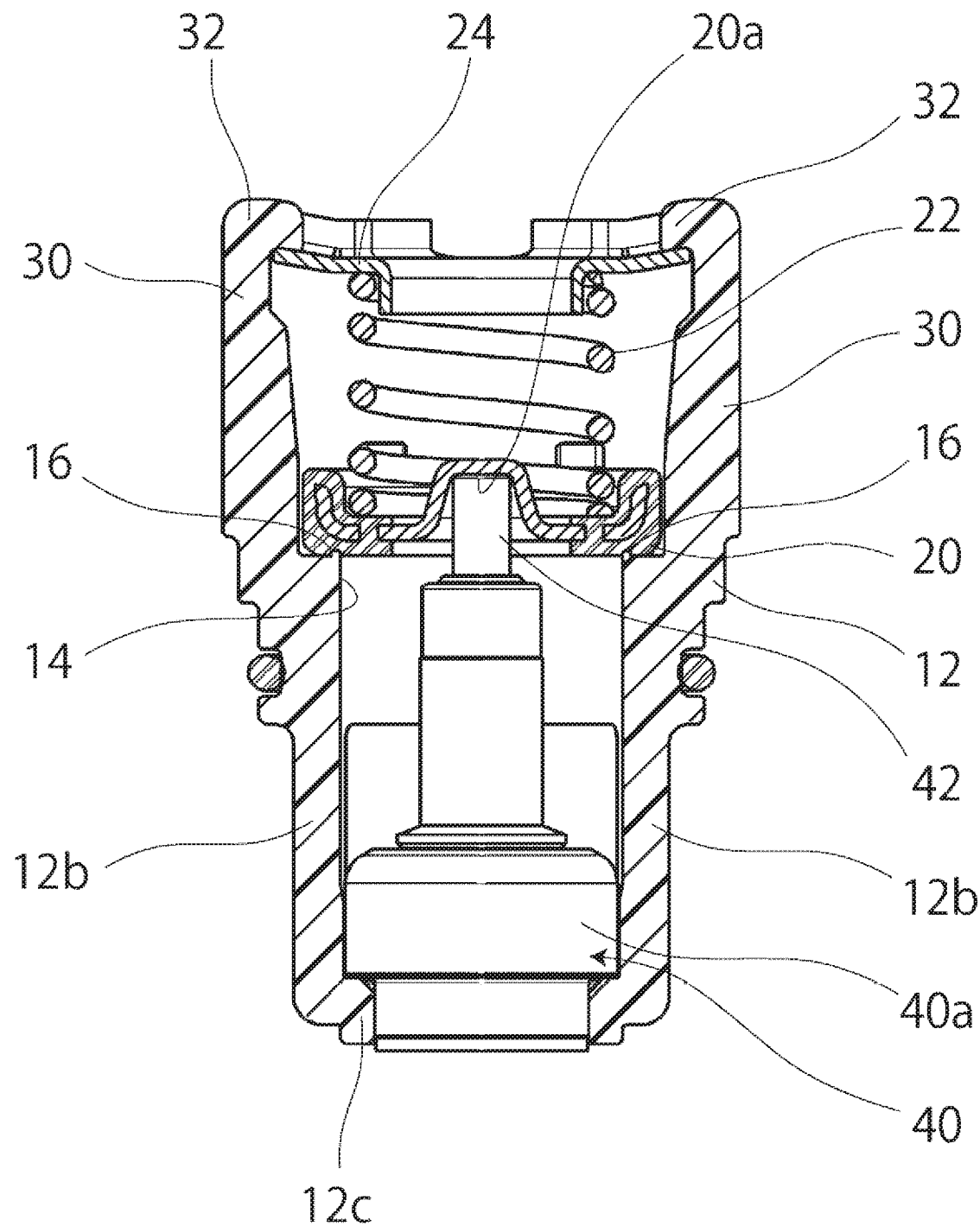
FIG. 2 is a vertical sectional side view of the main parts of the thermostat valve of FIG. 1.
Figure 6:
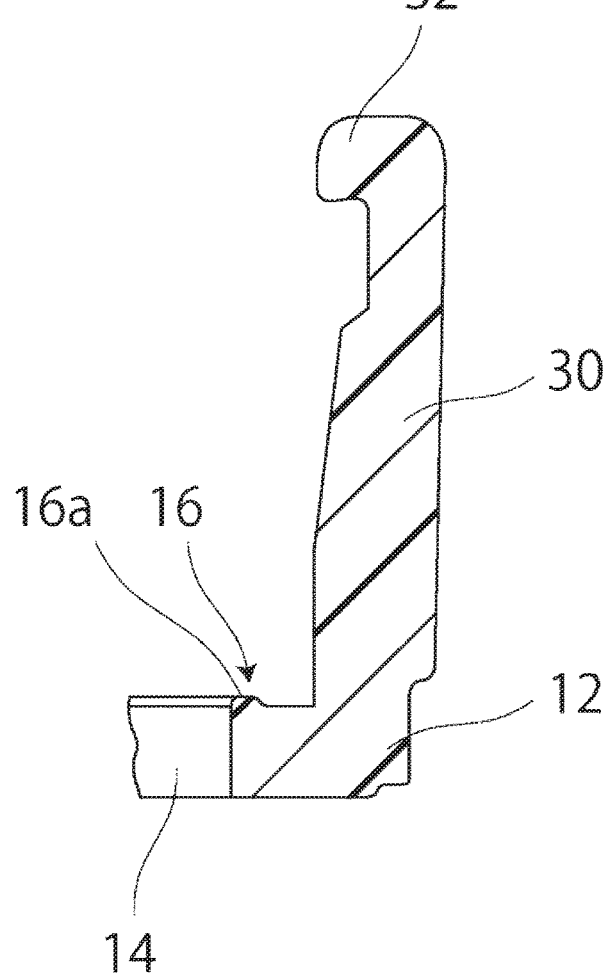
FIG. 6 is a view illustrating a hook at a tip of a locking arm of the present disclosure.

The spring seat 24 is locked and held in place along a portion of its outer rim by a pair of locking arms 30 projecting from the outer rim of one end of the cylindrical body of the valve housing 12 and having hooks 32 at their tips. As shown in FIG. 2 and FIG. 6, a tapered surface that slants inward is formed in the hooks 32 where they lock onto portions of the outer rim of the spring seat 22.

This type of tapered engagement is more secure than a simple lock and the actual locking area of the locking portion can be made smaller. As a result, the entire apparatus can be made more compact.

Reference numeral 36 in FIG. 1 indicates a plurality of projections projecting from the outer rim of one end of the disk-shaped body of the valve housing 12. These projections 36 are configured to restrict movement in the horizontal direction of the valve stem 20 seated on the valve seat 16.

A projecting portion that bulges upward in FIG. 2 is formed in the center portion of the disk-shaped valve stem 20. An engagement concavity 20a that engages a piston to be described below is formed on the inside of the projecting portion. Engagement with the tip of the piston 42 that projects, that is, advances from and retreats into, a thermo-element 40 to be described below restricts movement in the horizontal direction of the disk-shaped valve stem 20 and serves to position and hold the valve stem 20 in the correct location. Adopting such a construction also has the advantage of making it easy to insert the valve stem 20 into the thermostat valve 10.

With the piston 42 engaging the above-described projections 36, the base portions of the locking arms 30, and the engagement concavity 20a of the valve stem 20, the valve stem 20 is held in a state in which movement in the horizontal direction is restricted while being held in a state in which it can advance and retreat in the axial direction.

It should be noted that the above-described means of restricting movement in the horizontal direction is not limited to the above-described projections 36 and engagement concavity 20a, and alternatively only one of these two need be employed, or some other technique can be used to hold the valve stem 20 so that it is capable of advancing and retreating. For example, as the engagement structure consisting of the driving end of the aforementioned piston 42 and the engagement concavity 20a, provided that it is a structure that is easy to assemble and capable of allowing the valve stem 20 to advance and retreat, even a simple engagement structure will of course suffice, not to mention a structure that may be implemented by riveting.

Figure 3:
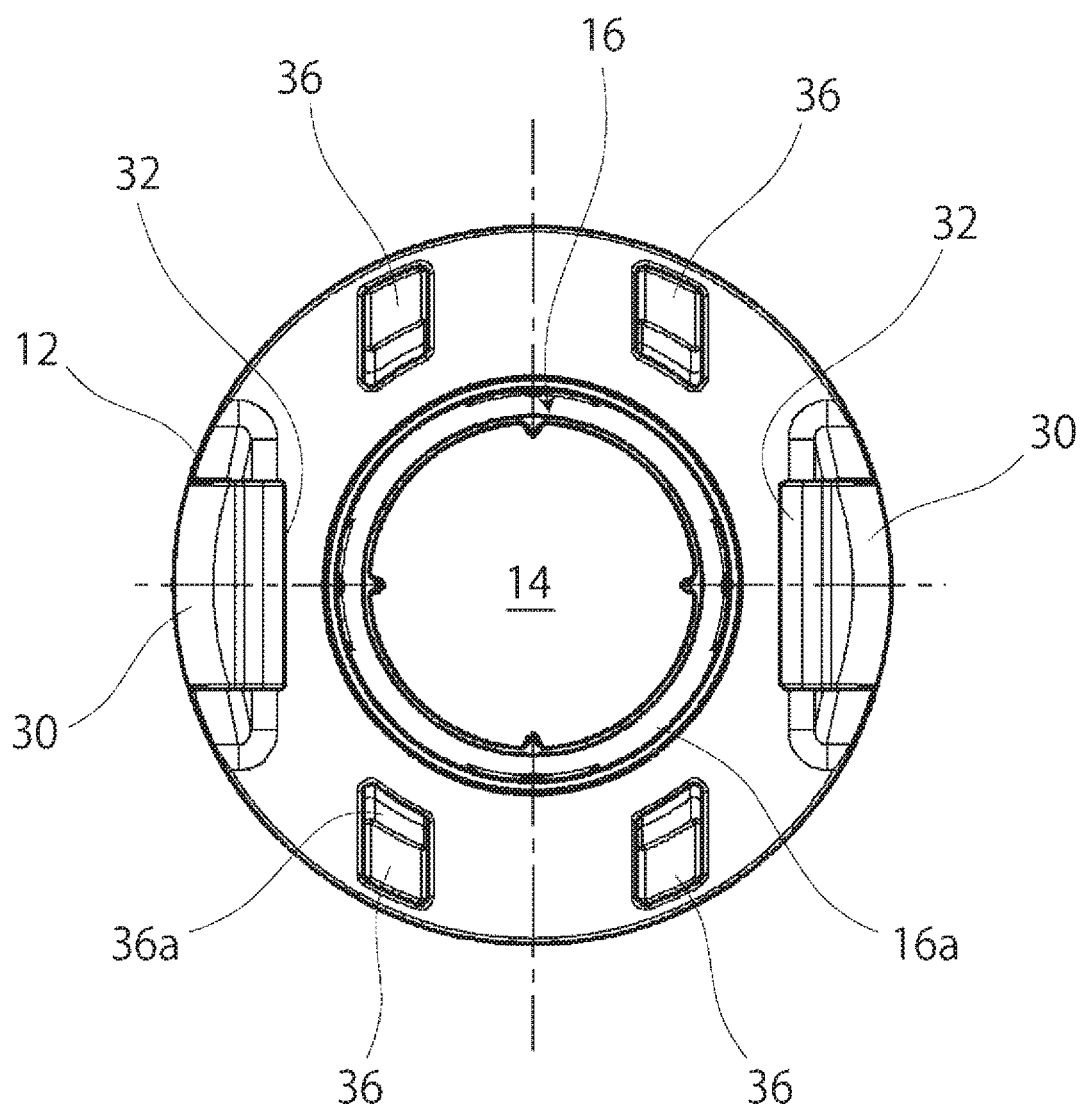
FIG. 3 is a plan view of the valve housing of the thermostat valve of claim 1, seen from the valve stem side.

As shown in FIG. 1 and FIG. 3, etc., the above-described projections 36 have a curved or chamfered surface 36a on the inside edge of the tip, which serves to guide the valve stem 20 to a predetermined position during assembly.

Reference numeral 40 denotes a thermo-element equipped with a thermo-sensitive portion 40a that senses the temperature of the coolant fluid, and is fitted to an element guide provided in the frame 12c of the valve housing 12 (a guide aperture inside the frame 12c). The thermo-element 40, as is well known, is equipped with the piston 42 that advances and retreats when the coolant reaches or exceeds a predetermined temperature. The tip of the piston 42 engages the engagement concavity 20a that is provided to the center portion of the valve stem 20, such that, when the temperature rises, the piston moves upward in FIG. 2 and pushes up the valve stem 20 against the biasing force of the coil spring 22 to open the thermostat valve.

It should be noted that although in the above-described embodiment the bottom end of the thermo-element 40 is pressed into and fitted into the element guide provided in the frame 12c of the valve housing 12, it goes without saying that a variety of means can be employed as this type of fixing method.

In the thermostat valve 10 configured as described above, according to the present disclosure, the valve housing 12 is constructed of a disk-shaped body and a frame 12c attached by legs, and moreover, an annular valve seat 16 having a certain predetermined width is formed at one end of the disk-shaped body of the valve body as the valve seat for seating the valve stem 20, such that the disk-shaped valve stem 20 is seated at the top thereof over a planar area of contact.

With this type of configuration, the seal as a valve is tight and the leakage when closing the valve can be made to be as small as possible. Moreover, with the above-described configuration, even if some slight misalignment of the valve stem 20 in the horizontal direction occurs, the planar area of contact with the valve seat 16 is maintained and a tight seal is maintained.

In the structure described above, the locking arms 30 and the projections 36 for installing other parts are provided at positions other than the rim of the opening 14 in one end of the disk-shaped body of the valve housing, so that with a single mold a parting line P or the like does not appear at the top of the annular step 16a that becomes the valve seat 16, and moreover the thermostat valve can be molded in a state in which burrs do not appear on the valve seat. In other words, by configuring the mold structure of the resin mold such that the parting line P between the mold and the insert mold is positioned to avoid the top of the annular step 16a, in particular at a position offset from the outer rim of the annular step 16a, even if burrs appear during resin molding they do not affect the seal surface of the valve.

Figure 5:
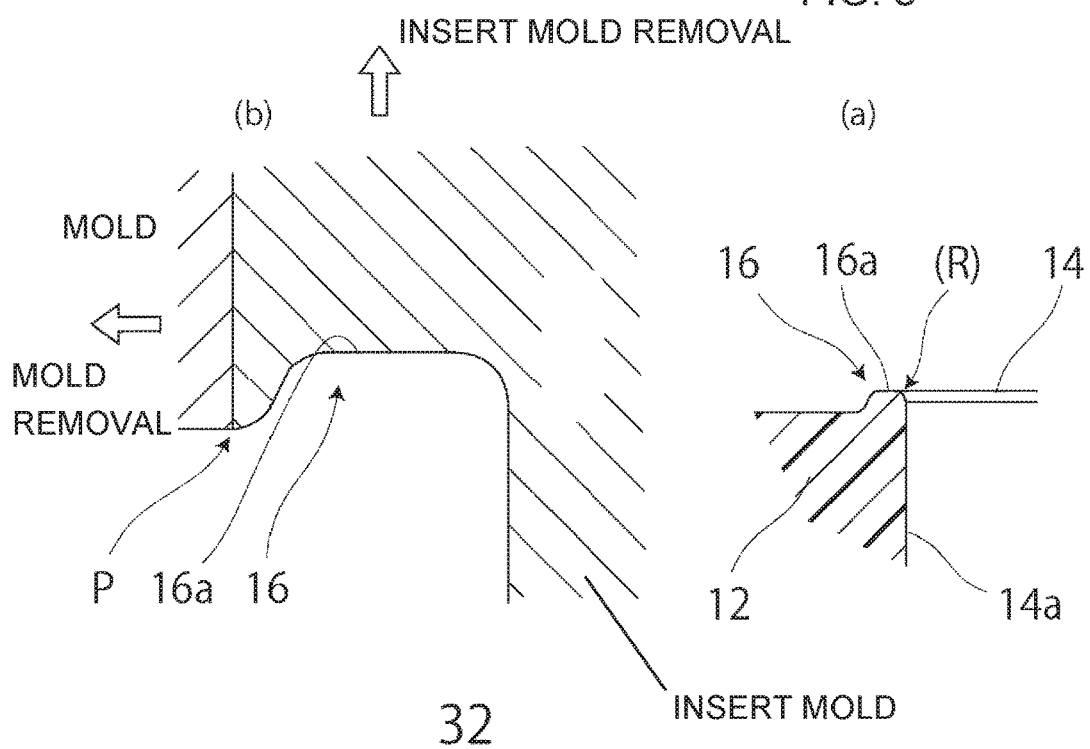
FIG. 5 shows (a) an enlarged view of the valve seat of the present disclosure and (b) an explanatory view of the thermostat valve as it is being manufactured.

That is, according to the present disclosure, as is clear from states (a), (b) of FIG. 5, the thermostat valve is configured so that the joined faces of the mold and the insert mold (the parting line P) are positioned outside the annular step 16a formed in one end of the annular body of the valve housing 12. It should be noted that the insert mold is for forming the annular step 16a and an inner peripheral surface 14a of the opening 14, etc., and is configured so that the die can be removed from the top of the valve housing 12. The mold used to mold the outer peripheral surface of the valve housing 12 is horizontally split and removed to the side (in the direction indicated in the drawing) to mold the outside of the valve housing 12.

It should be noted that in state (b) in FIG. 5, the parting line caused by the mold and the insert mold formed outside the annular step 16a, such that, even if burrs appear at this portion, it is clear that they have no effect whatsoever on the valve seat 16 on the top of the annular step 16a. Of course, the parting line P may be formed at any appropriate position provided that it is a position that avoids the top of the annular step 16a.

With the thermostat valve 10 configured as described above, an annular step having a certain predetermined width is formed along the rim of the opening in one end of the disk-shaped body of the valve housing 12, with the valve seat 16 that the valve stem contacts formed at the top of the annular step. Accordingly, a tight planar seal forming an area of contact can be achieved when the valve is closed, thus improving seal performance. As a result, it becomes possible to keep leakage to either zero or a negligible amount.

Moreover, since the valve housing is a resin molded product and can be easily molded in complex shapes, the number of constituent parts can be reduced in comparison to the conventional structure, assembly becomes easy, and moreover the thermostat valve can be made even more lightweight. In particular, with its poppet valve structure, adequate flow volume area can be achieved. As a result, the entire apparatus can be made smaller and more compact.

Moreover, due to the relation between the valve stem 20 and the valve seat 16, the thermostat valve 10 having the structure described above can also function as a differential pressure valve. Therefore, when the engine is under high load at low temperature, for example (such as at high rpm with the water pump also speeding up), it also has a relief capability that allows excess pressure to escape, thereby heading off breakage of pipes inside the cooling circuit.

In addition, with the thermostat valve 10 described above, the thermo-element guide is provided at a position away from the valve portion comprised of the valve stem 20 and the valve seat 16, and thus the thermo-element 40 can be located in a fluid flow path at a position where it can easily sense the temperature.

Figure 4:
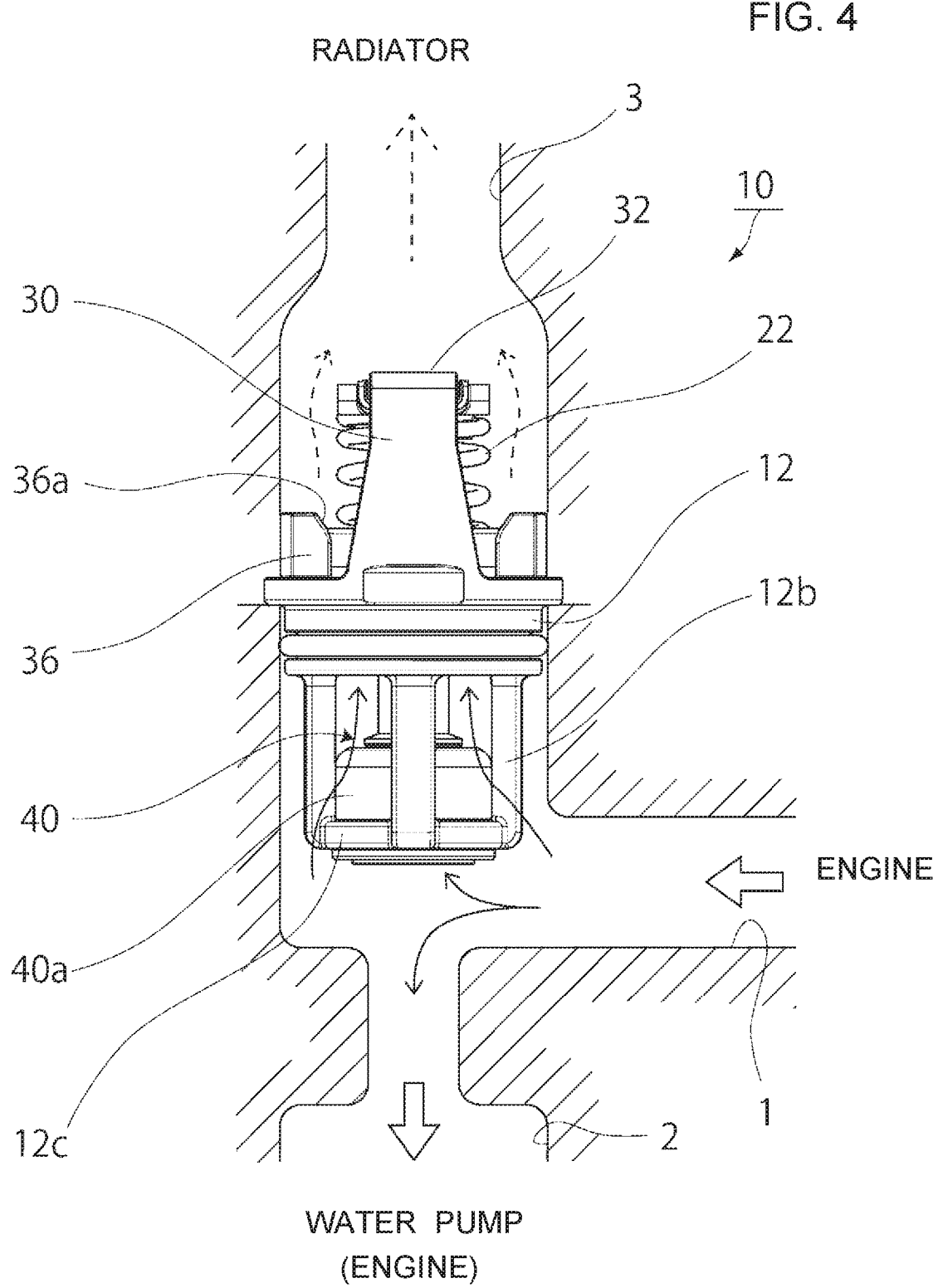
FIG. 4 is a schematic view illustrating a case in which the thermostat valve according to the present disclosure is installed in a fluid pipe system.

It should be noted that, as shown in FIG. 4, the thermostat valve 10 according to the present disclosure is installed on the fluid intake side of a junction leading to a bypass pipe 3 provided between pipes 1, 2 through which a coolant or other fluid flows. Then, when the fluid temperature is low, the valve at this junction is kept closed and the flow of fluid through the pipes 1, 2 is maintained. By contrast, when the fluid temperature rises, or when the fluid pressure reaches or exceeds a certain predetermined pressure, the valve opens and functions to divert fluid to the bypass pipe 3 side.

At this time, the bottom of the thermostat valve 10 with the thermo-element 40 provided is set facing into the aforementioned pipes 1, 2, with the axis of the valve aligned with the flow of fluid so that the valve stem 20 is moved downstream with the flow of fluid to open the valve.

However, although the thermostat valve 10 configured as described above can be used as a fail-safe thermostat for a coolant control valve that runs off the motor like a rotary valve or the like, use of a valve having a structure like that described above can provide extraordinary effects. That is, in this type of fail-safe thermostat, generally the leakage volume is considered not just to the thermostat by itself but as a set together with the main cooling valve, and therefore the thermostat valve itself must be as small as possible. Although there has long been demand for a more compact thermostat valve, the valve structure of the present disclosure has the advantage of making it possible to meet this demand for this type of compact thermostat valve.

the present disclosure is not limited to the structure of the embodiments described above, and accordingly the shapes and structures of the parts that comprise the thermostat valve can be changed and varied as convenient. Moreover, the applications of the thermostat valve 10 of this type are such that it can be adapted to systems through which flow a variety of fluids. In short, provided that it is a thermostat valve that is installed in a variety of fluid flow paths and controls the flow of fluid in response to the fluid temperature and the fluid pressure, the thermostat valve of the present disclosure can be applied and provide extraordinary effects.

PARTIAL LIST OF REFERENCE NUMBERS

10 Thermostat valve
12 Valve housing
12b Leg
12c Frame
14 Opening
16 Valve seat
16a Annular step
20 Valve stem
20a Engagement concavity
22 Coil spring
24 Spring seat
30 Locking arm
32 Tip hook
36 Projection
40 Thermo-element
42 Piston

The invention claimed is:

1. A thermostat valve comprising:
a substantially cylindrical valve housing formed as a single integrated unit out of a synthetic resin material and having an annular body, with a valve seat formed on a rim of an opening in one end of the annular body and a frame attached to the annular body by a plurality of legs extending axially from an outer edge of an opposite end of the annular body;
a disk-shaped valve stem disposed in one end of the valve housing and movable along an axial direction of the valve stem so as to be selectively seated against the valve seat;
spring means that biases the valve stem in a valve closing direction to seat the valve stem against the valve seat;
a spring seat disposed at an opposite end of the spring means away from the valve stem side, the spring seat locked and held in place by hooks at tips of locking arms extending from the valve housing; and
a thermo-element, fixedly mounted to an element guide provided in the frame of the valve housing and configured to move the valve stem in a valve opening direction in response to fluid temperature,
wherein an annular step is formed at a portion of the valve housing adjacent to the rim of the opening in the one end of the valve housing,
the annular step having a top portion of a certain predetermined width,
the top portion of the annular step forming the valve seat against which the valve stem is contactable as a plane, and
the thermo-element and the spring means are provided on opposite sides of the valve, and
a thermo-element element guide aperture is provided to the frame of the valve housing on the same side of the valve as the thermo-element.

2. The thermostat valve as claimed in claim 1, wherein the valve housing is resin molded using a mold structure configured so that a parting line is formed at least at a location that avoids the top portion of the annular step.

3. The thermostat valve as claimed in claim 1, wherein a plurality of projections is provided around the outer edge of the annular body of the valve housing,
wherein the plurality of projections and the locking arms are together configured to restrict movement of the valve stem in a horizontal direction.

4. The thermostat valve as claimed in claim 3, wherein each of the plurality of projections has a tip portion having a curved or chamfered surface on an inside edge of the tip portion.

5. The thermostat valve as claimed in claim 1, wherein an engagement concavity that engages a driving end of the thermo-element is formed in a center portion of the valve stem.

6. The thermostat valve as claimed in claim 1, wherein the hooks at the tips of the locking arms have a tapered surface that slants inward toward the end of the tip of the hook.

\* \* \* \* \*